(12) United States Patent
Gunasekara et al.

(10) Patent No.: US 9,509,580 B2
(45) Date of Patent: Nov. 29, 2016

(54) ADAPTIVE POWER CONTROL IN A NETWORK

(71) Applicant: Time Warner Cable Enterprises LLC, New York, NY (US)

(72) Inventors: Don Gunasekara, Reston, VA (US); Harriet DuBois, Herndon, VA (US); Kevin Caldwell, Vienna, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 595 days.

(21) Appl. No.: 13/793,221

(22) Filed: Mar. 11, 2013

(65) Prior Publication Data

US 2014/0258739 A1    Sep. 11, 2014

(51) Int. Cl.
*H04L 12/10* (2006.01)
*H04L 12/26* (2006.01)

(52) U.S. Cl.
CPC ........... *H04L 43/0817* (2013.01); *H04L 12/10* (2013.01)

(58) Field of Classification Search
CPC .............. G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS

| | | | | |
|---|---|---|---|---|
| 6,262,493 B1* | 7/2001 | Garnett | | G06F 1/26 307/64 |
| 6,684,339 B1* | 1/2004 | Willig | | G06F 1/263 709/232 |
| 6,879,139 B2* | 4/2005 | Brown | | G06F 1/263 323/299 |
| 7,209,968 B1* | 4/2007 | Secer | | 709/226 |
| 8,151,122 B1* | 4/2012 | Ranganathan | | G06F 1/26 713/300 |
| 8,338,988 B2* | 12/2012 | Togare | | G06F 1/263 307/85 |
| 8,818,192 B1* | 8/2014 | Smith | | H04B 10/00 398/171 |
| 2007/0260904 A1* | 11/2007 | Camagna | | H04L 41/0681 713/310 |
| 2009/0010171 A1* | 1/2009 | Gupta | | H04L 41/0659 370/244 |
| 2009/0325478 A1* | 12/2009 | Sun | | H04K 3/222 455/1 |
| 2011/0126035 A1* | 5/2011 | Kaneko | | 713/320 |
| 2014/0347103 A1* | 11/2014 | Snook | | H03K 17/0828 327/109 |

* cited by examiner

*Primary Examiner* — Thomas Lee
*Assistant Examiner* — Mohammad A Rahman
(74) *Attorney, Agent, or Firm* — Chapin Intellectual Property Law, LLC

(57) ABSTRACT

A power manager in a network monitors a set of multiple interconnected network elements for failures. During non-failing operation, the multiple interconnected network elements cooperatively communicate amongst each other to provide one or more computer devices connectivity to a core network. In response to detecting a failing network element in the set, the network power manager adaptively controls power settings of at least one non-failing network element in the set of multiple interconnected network elements. Via power control notifications, power settings of the non-failing network elements that depend on the particular failing network element can be reduced to save power in the network. Subsequent to correcting the failure, when the particular network element is functioning properly again, the network power manager notifies the non-failing network elements in the reduced power mode to switch back to a standard power mode and standard operational mode again.

43 Claims, 16 Drawing Sheets

Wireless Access Point Information

| Model | Unit Type | AC Power | DC Power | Power Draw |
|---|---|---|---|---|
| Ruckus 7761 | Outdoor / Embedded CM | 40-90 V AC | 12 V DC | 10W standby mode<br>60W (with Heater and PoE output Enabled)<br>25W (with Heater and PoE output Disabled) |
| Ruckus 7363 | Indoor | 110-240 V AC | Power over Ethernet and 12V DC | 12.95W (PoE), 12W (12V DC) |
| Ruckus 7762 | Outdoor | | Power over Ethernet and 12V DC | 12.95W (PoE), 15W (12V DC) |
| BelAir100 SNE | Outdoor / Embedded CM | 40-90 V AC | 12 V DC | 28W (Typical Power consumption) |
| BelAir 20E | Indoor | 100-240 ACV | 48V / 0.8A | 17 W |
| Cisco 3502E | Indoor | 100 to 240 VAC | 44 to 57 VDC | 12.95W, 15.4W (PoE) |

FIG. 11

ZoneFlex AP Power Consumption Summary

| Description | ZF7363 | ZF7962 | ZF7762 (heater off) | ZF7762 (heater on) |
|---|---|---|---|---|
| PoE Input (min) | 3W | 3W | 3W | 11.5W |
| 20% Traffic Load | 5W | 5W | 5W | 13.5W |
| PoE Input (max) | 12.95W | 12.95W | 12.95W | 24W |

| Description | ZF7761-CM (Heater Off No PoE Out) | VA @60V | Current (A) |
|---|---|---|---|
| POC AC Input (min) | 18W | 28 | 0.47 |
| 20% Traffic Load | 22W | 34 | 0.57 |
| POC AC Input (max) | 25W | 37 | 0.62 |

Average Daily Power consumption 0.528kW-hrs

| Description (cold climate operation) | ZF7761-CM (Heater On No PoE Out) | VA @60V | Current (A) |
|---|---|---|---|
| POC AC Input (min) | 40W | 58 | 0.97 |
| 20% Traffic Load | 44W | 63 | 1.05 |
| POC AC Input (max) | 47W | 66 | 1.10 |

FIG. 12

WAP Controllers

| Model | AC Power/Current | DC Power/Current | Power Supplies |
|---|---|---|---|
| ZD 5000 | 50/60 HZ 100-127VAC/Max Current 8.9A 200-240VAC/Max Current 4.5A | 48-60VDC/Max Current 20.5A | Dual, Hot swappable DC (or) AC Power Supplies |
| WLC 5508 | 100 to 240 VAC, 50/60 Hz/ 1.05 A at 110 VAC, 115 W Maximum/ 0.523 A at 220 VAC, 115 W Maximum. | - | Redundant Power Supplies |

FIG. 13

Aggregation Switch

| Specification | Model | 300W AC | 300W DC |
|---|---|---|---|
| Input Current | | 4A at 100V | 8A @ -40.5 to -75VDC |
| | | 8A at -48 to -60V | |
| Output Current | | 25A at 12 VDC | 25A @ 12 VDC |
| Model | Cisco 4948 | | |

FIG. 14

Subscriber Policy Routers

| Model | AC Power/Current | DC Power/Current | Power Supplies |
|---|---|---|---|
| Cisco ASR 1004 | Worldwide ranging AC (85 to 264V; 120 or 240V, 60 or 50 Hz nominal)/960W | Worldwide ranging DC (-40.5 to -72; -48V nominal)/1020W Maximum out 760W | Dual power supply supported. Either AC (or) DC |

FIG. 15

Radius Servers

| Power |
|---|
| Dual-redundant, hot-swappable power supply |
| Maximum output power: 760 W |
| Maximum AC input current at 100 V AC and 760 W output: 9.0 A |
| Specified power supply efficiency at 760 W (100%) load: 87% |

FIG. 16

ADAPTIVE POWER CONTROL IN A NETWORK

BACKGROUND

Conventional computer networks include an interconnection of many different types of devices and execute many different algorithms to provide connectivity between computers. For example, a network can include multiple computers that communicate with each other over a respective network of routers, switches, communication links, etc. Typically, the computers generate messages addressed to a respective target computer in the network. The resources in the network such as routers, switches, etc., cooperate to forward the messages to the appropriate target computer as specified by a sender.

Access by a computer to use of a core network may be conditional. For example, a computer device may attempt to connect to a wireless access point to access a respective core network. The process of being granted access to a respective core network may require many different types of communications with many different servers in the network. For example, to enable communications with a respective computer device, a wireless access point may need to communicate with one or more switches, controllers, server resources, etc., in a network in order to provide access to the core network. Failure of any of multiple different network elements can prevent access to a core network.

BRIEF DESCRIPTION OF EMBODIMENTS

Conventional networks suffer from deficiencies. For example, as mentioned above, one of multiple interconnected network elements in a network may fail. Because a particular network element may be critical to establishing a respective network connection, it may not be possible for multiple interconnected network elements to collectively provide a respective computer device access to a network.

Embodiments herein are directed to reducing power consumption in a network environment in response to detecting a failure condition of a network element.

More specifically, in accordance with one embodiment, a power manager in a network monitors a set of multiple interconnected network elements in a network environment for failures. The multiple interconnected network elements cooperatively communicate amongst each other to provide one or more computer devices connectivity to a core network. For example, the network environment can include a data plane (i.e., messaging plane) over which multiple network elements communicate with each other to collectively provide a network element access to a core network.

Assume that the power manager detects occurrence of a failure associated with a particular network element in the set of multiple interconnected network elements. The failure can cause complete or partial disruptions of services in the data plane. In response to detecting the failure, the network power manager adaptively controls power settings of at least one non-failing network element in the set of multiple interconnected network elements (e.g., in the data plane).

Accordingly, if a particular network element fails, power settings of the non-failing network elements that depend on the particular failing network element can be reduced to save power in the network. Reducing power consumption can include restricting non-failing network elements from performing certain functions that require substantial power and that are not useful because of a failing network element. In certain instances, the power settings of the failing network element can be controlled to reduce power consumption as well.

Subsequent to correcting the failure, and when the particular failing network element is functioning properly again, the network power manager can notify the non-failing network elements to switch from operating in the reduced power mode back to a standard power mode again.

In accordance with another embodiment, a network power manager monitors a health status of multiple interconnected network elements in a network environment. As mentioned, the multiple interconnected network elements can be configured to cooperate to provide one or more computer devices connectivity to a core network.

Assume that the network power manager detects occurrence of a failure of a particular network element of the multiple interconnected network elements in the network environment. The network power manager identifies a set of at least one network element in the network environment that depend at least in part on a health of the particular network element to provide the connectivity to the computer device.

In one embodiment, the network power manager has access to stored network interdependency information associated with multiple interconnected network elements. The interdependency information indicates a functional and/or communication interdependency of the multiple interconnected network elements. The network power manager analyzes the interdependency information derived from the network topology information to identify a set of one or more network elements in the network environment whose communications depend at least in part on a health of the particular failing network element to provide the connectivity to the computer device.

The network power manager notifies the set of one or more network elements of the failure. In one embodiment, via communications with the set of one or more network elements, the network power manager indicates an identity of the particular failing network element and location information specifying a location of the particular network element that experiences the failure. The network power manager can learn of the failure via any suitable method such as by: i) receiving a health status message from the particular network element indicating the failure; ii) failing to receive a health status message from the particular network element indicating that the particular network element is functioning properly; and so on.

Monitoring a network environment and providing notifications of failing devices is useful over conventional techniques. For example, the non-failing network element that depends on the proper functioning of the failing can be operated in a power savings mode. Upon restoration of the failing network element back to proper operation, the non-failing network element can be operated in a standard operational mode (e.g., non-power savings mode) again.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by a processor of a respective computer device, cause the processor or multiple processors of the system to: monitor a set of multiple interconnected network elements in a network environment, the multiple interconnected network elements cooperatively communicate to provide a computer device connectivity to a core network; detect occurrence of a failure associated with a particular network element in the set of multiple interconnected network elements; and in response to detecting the failure, adaptively control power settings of at least one non-failing network element in the set of multiple interconnected network elements.

Yet another embodiments herein includes a method and computer readable storage medium and/or system having instructions stored thereon. The instructions, when executed by a processor of a respective computer device, cause the processor or multiple processors of the system to: monitor a health status of multiple interconnected network element in a network environment, the multiple interconnected network elements cooperating to provide a computer device connectivity to a core network; detect occurrence of a failure of a particular network element of the multiple interconnected network elements in the network environment; identify a set of at least one network element in the network environment that depend at least in part on a health of the particular network element to provide the connectivity to the computer device; and notify the set of at least one network element of the failure.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for reducing power consumption in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIGS. 11-16 are diagrams illustrating example of network elements and power consumption specifications.

DETAILED DESCRIPTION AND FURTHER SUMMARY OF EMBODIMENTS

As mentioned above, according to one embodiment, a power manager in a network monitors a set of multiple interconnected network elements for failures. During non-failing operation, the multiple interconnected network elements cooperatively communicate amongst each other to provide one or more computer devices connectivity to a core network.

In response to detecting a failing network element, the power manager adaptively controls power settings of one or more non-failing network elements. For example, via power control notifications from the power manager to the non-failing network elements, power consumption of one or more of the non-failing network elements that depend on the particular failing network element can be reduced. Subsequent to correcting the failure, when the particular network element is functioning properly again, the network power manager notifies the non-failing network elements in the reduced power mode to switch back to a standard operational and power mode again.

Figure 1:
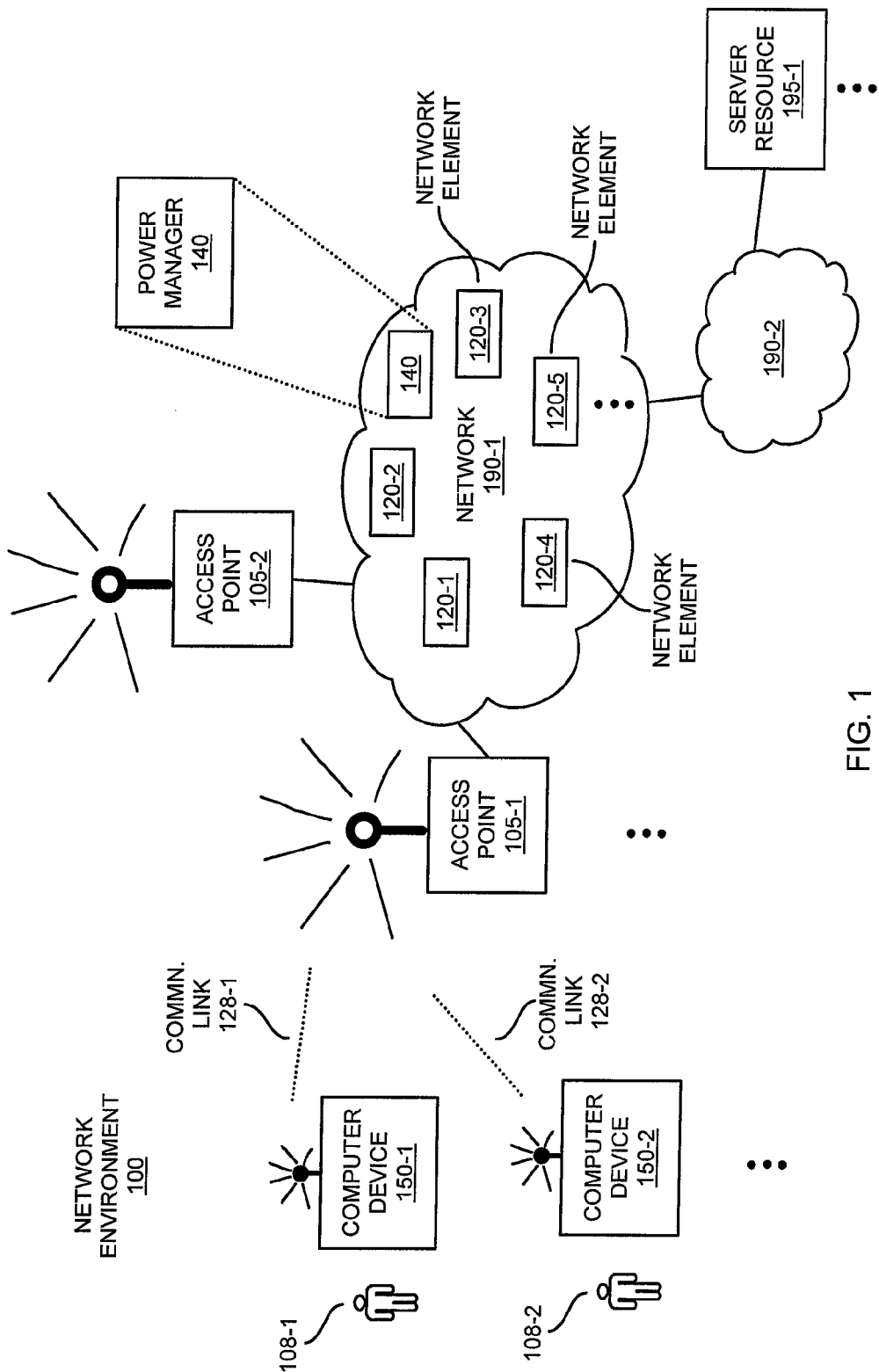
FIG. 1 is an example diagram illustrating a power manager and connectivity of network elements in a network environment according to embodiments herein.

Now, more specifically, FIG. 1 is an example diagram illustrating a network environment according to embodiments herein.

As shown, network environment 100 includes multiple computer devices 150 (e.g., computer device 150-1, computer device 150-2, etc.), multiple wireless access points 105 (e.g., access point 105-1, access point 105-2, . . . ), network 190-1, network 190-2, server resource 195-1, etc. A respective user operates each of the computer devices 150. For example, user 108-1 operates computer device 150-1; user 108-2 operates computer device 150-2; etc.

In one embodiment, network 190-1 includes multiple network elements 120 (e.g., network element 120-1, network element 120-2, network element 120-3, network element 120-4, network element 120-5, etc.) facilitating connectivity between the computer devices 150 and the network 190-2.

Each of computer devices 150 can be stationary or mobile. Computer devices 150 utilize access points 105 as a means to connect to a respective network such as the Internet. For example, each of access points 150 can be WiFi™ access points or wireless base stations configured to support wireless communications such as those according to a WiFi™ protocol such as 802.11 or any other suitable wireless communication protocol. By way of a non-limiting example, communication links 128 can be WiFi™ wireless communication links or any other suitable type of communication links.

In one embodiment, the access points 105 are open (publicly accessible) networks in which any of multiple public computer users can attempt to establish a network connection to obtain access to core network and a network such as the Internet. In accordance with another embodiment, the access points 105 are private networks in which only corresponding subscribers are able to use as a way of accessing a core network such as the Internet.

Subsequent to establishing a wireless communication link 128-1, the computer device 150-1 is able to retrieve content from different sources such as server resource 195-1 over network 190-2 such as the Internet.

In one embodiment, establishing connectivity between a respective computer device 150-1 and network 190-2 requires cooperation amongst multiple network elements 120 in network 190-1. For example, the network elements can represent different resources such as switches, routers, authentication servers, DHCP servers, drivers, algorithms, executing software, etc. The network elements 120 cooperatively communicate amongst each other to establish wireless communication link 128 and provide computer devices 150 access to network 190-2.

Any of the network elements 120 in network 190-1 can fail. Failures can occur as a result of power outages, battery backup outages, software bugs, electrical component failures, mechanical failures, etc.

Depending on which of the network elements 120 fails, users 108 operating computer devices 150 may not be able to log on to and/or access network 190-2. In other words, multiple network elements in network 190-1 must work properly in order to provide connectivity between the computer devices 150 and the network 190-2.

Embodiments herein include power manager 140. As discussed herein, power manager 140 monitors a health of the different network elements 120 operating in network environment 100. In one non-limiting example embodiment, in the event of detecting a failing network element, the power manager 140 initiates adaptive control of power settings associated with network environment 100 to reduce power consumption.

Figure 2:
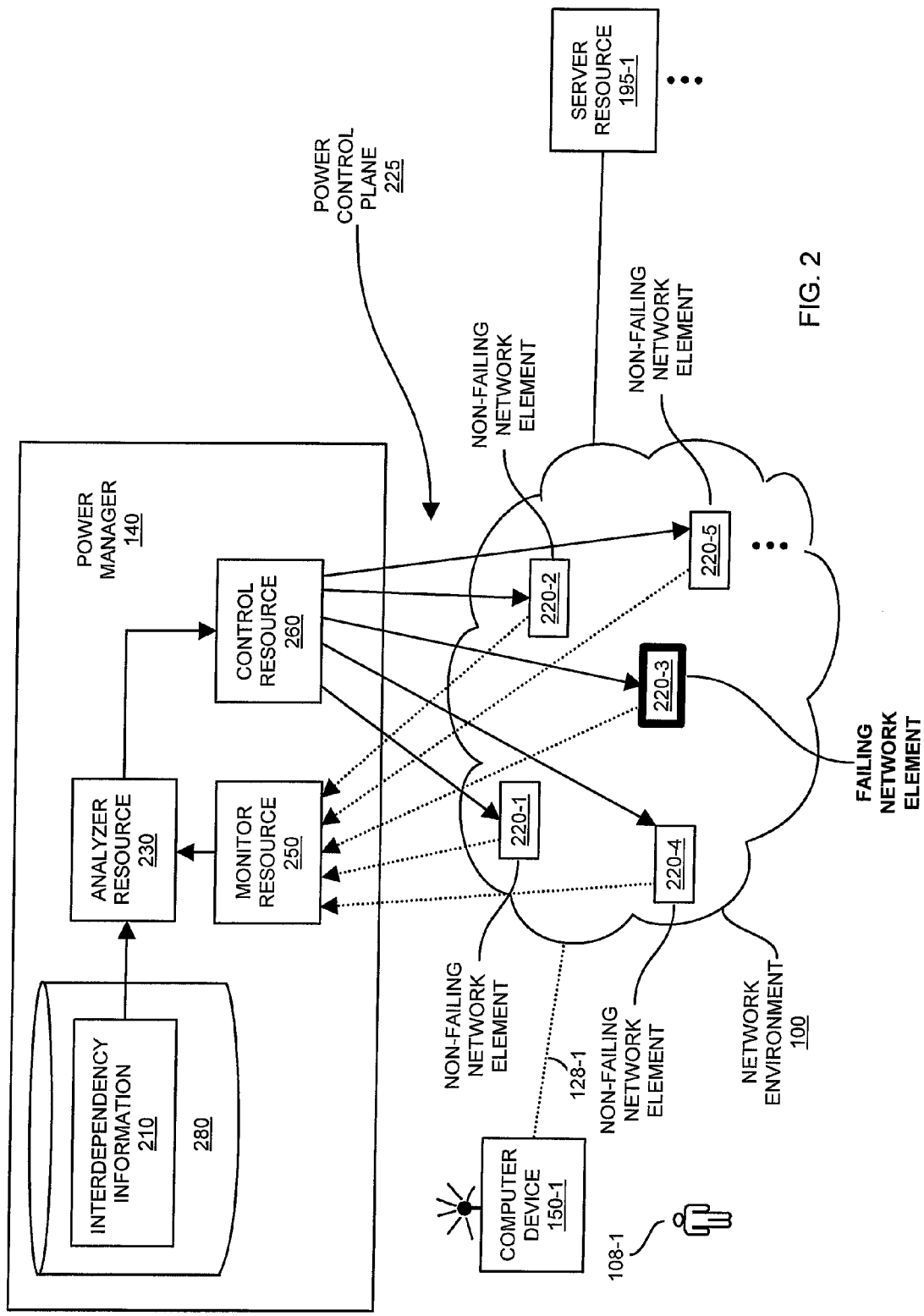
FIG. 2 is an example diagram illustrating a power manager according to embodiments herein.

FIG. 2 is an example diagram illustrating of a power manager according to embodiments herein.

As shown, power manager 140 includes monitor resource 250. Monitor resource 250 monitors a set of multiple functionally interconnected network elements 220 in network environment 100. As mentioned, the multiple interconnected network elements 220 cooperatively communicate in a data plane of network element 100 to provide one or more computer devices connectivity to a core network such as network 190-1 or network 190-2.

By way of a non-limiting example, monitor resource 250 communicates with each of the network elements 220 to learn whether each of the respective network elements 220 is functioning properly. Messages can be pushed or pulled from the network elements 220. For example, each of the network elements 220 can be configured to periodically generate and transmit health information to the monitor resource 250. Alternatively, the network elements 220 can respond to query messages generated by the monitor resource 250 to the network elements 220.

Depending on the type of function provided by the respective network element, the respective network element may be prone to many different types of failures. In one embodiment, the monitor resource 250 receives (health) status information from the different network elements in accordance with a communication protocol such as SNMP (Simple Network Management Protocol) although any suitable communication protocol can be used to receive health status updates from the different network elements.

A respective network element may lose main AC power due to a power outage. In such an instance, the respective network element may not be able to provide certain functionality in network 190-1. A respective network element may include a battery. The battery may allow the respective network element to operate on backup power for only a limited amount of time, after which, the respective network element may no longer be functional if AC such as 115 VAC power is not restored.

A respective network element may be a storage device and experience a software driver failure. The software driver may be critical element facilitating access to stored data. In the event of a software driver failure, it may not be possible to access data (e.g., authentication information, authorization information, accounting information, etc.) stored in the storage device. In the event of a software driver failure, it may not be possible to retrieve critical data stored on a respective storage disk.

Embodiments herein can include a monitor resource 250 that receives a respective health status message from each of multiple interconnected network elements 220. Each respective health status message indicating a geographical location of a corresponding network element that transmits the respective health status message.

Because of the interdependency of network elements 220, failure of a given network element in the network element 100 may render it impossible to establish and/or maintain connectivity between a computer device 150 and the network 190-2.

To save power amongst network elements 220 during a failure condition, the power manager 140 can notify other non-failing network elements 220 of a failure of a particular network element.

More specifically, assume that the monitor resource 250 learns that network element 220-3 experiences a respective failure. Assume that the monitor resource 250 learns that network element 220-1, network element 220-2, network element 220-4, network element 220-5, etc., do not experience a failure via respective feedback messages.

The monitor resource 250 can detect the failure or non-failing of a respective network element in a number of different suitable ways. For example, the monitor resource 250 may fail to receive a respective health status message (such as a heart-beat signal) from the particular failing network element 220-3. Lack of receiving a message from the network element 220-3 may indicate that the network element 220-3 is functioning properly.

Alternatively, the monitor resource 250 can receive a health status message transmitted from a communication interface of the network element 220-3. The health status message can indicate conditions such as that the network element is experiencing a particular type of failure. Based on a received status message, the monitor resource 250 may be informed of the different types of functionality that cannot be provided by the failing network element 220-3 as a result of a respective failure.

More specifically, the message from the network element may indicate information such as what functionality associated with the network element 220-3 is disabled, when the network element 220-3 will be disabled such as because the network element 220-3 lost AC power and is currently operating on a battery back, etc.

By further way of a non-limiting example, a message received from the failing network element 220-3 can include identity information indicating an identity of the particular network element 220-3 and location information indicating a geographical location of the particular failing network element 220-3. The geographical location information can be programmed into the network element upon installation.

Note that as an alternative to receiving location information in a message from the failing network element 220-3, the power manager 140 can receive an identity of the failing network element 220-3 and utilize stored network configuration setting information to map the identity of the failing network element to a corresponding location where the failing network element 220-3 resides in the network 190-1.

Assume in this example, as mentioned above, that the monitor resource 250 detects occurrence of a failure associated with a particular network element 220-3 in a set of multiple interconnected network elements 220. In response to detecting the failure associated with network element 220-3, the power manager 140 adaptively controls power settings of one or more non-failing network elements.

For example, as discussed above, the power manager 140 may learn that network element 220-3 experiences a failure. In furtherance of adaptively controlling power settings, the power manager 140 can be configured to notify the one or more non-failing network elements of a geographical location and identity of the particular network element that experienced the failure.

More specifically, as mentioned above, assume that monitor resource 250 detects a failure of network element 220-3. The monitor resource 250 forwards notice of the failure to analyzer resource 230. Analyzer resource 230 obtains an identity of the particular network element 220-3 that experiences the failure.

Figure 3:
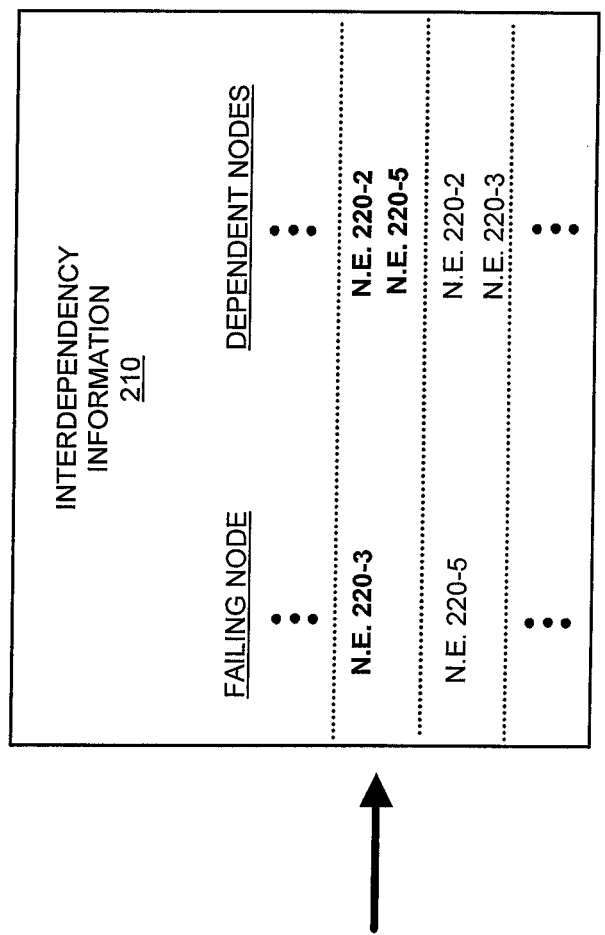
FIG. 3 is an example diagram illustrating interdependency information according to embodiments herein.

The analyzer resource 230 accesses the interdependency information 210 stored in repository 280 as shown in FIG. 3. By way of a non-limiting example, the stored interdependency information 210 can indicate a communication interdependency of the multiple interconnected network elements 220. For example, network element 220-3 may be required to communicate with network elements 220-2 and 220-5 to perform a particular function. If any of the network elements in a group including network elements 220-2, 220-3, and 220-5 experiences a failure, it may not be possible to perform the function and connect a respective computer device to a network. Accordingly, the analyzer resource 230 can analyze the interdependency information 210 to learn of which types of communications depend at least in part on a health of the particular network element to provide the connectivity to the computer device.

By way of a non-limiting example, the interdependency information 210 can indicate a parent-child relationship between the network elements. For example, failing network element 220-3 may be considered a parent network element; each of the network elements 220-2 and 220-3 may be considered child network elements with respect to the network element 220-3. In the event of a failure associated with the parent network element 220-3, power settings of the child network elements such as network elements 220-2 and 220-5 can be reduced.

One way to produce interdependency information 210 is to analyze network topology information capturing the interconnectivity of the network elements 220 and determine which of the non-failing network elements can be shut down in response to detecting a parent network element that fails.

Via processing of the interdependency information 210, in this example, the analyzer resource 230 maps the failing network element 220-3 to network element 220-2 and network element 220-5. For example, the analyzer resource 230 analyzes the interdependency information 210 to identify the set of one or more network elements in the network environment that depend at least in part on proper functioning of a failing network element to provide the connectivity to the computer device.

In this example embodiment, as indicated by the interdependency information 210, the dependent network nodes (i.e., non-failing network element 220-2 and non-failing network element 220-5) depend on proper operation of network element 220-3 to collectively perform a respective function. Since the network element 220-3 is failing (e.g., not operational due to a power outrage, internal component failure, etc.), the power manager 140 initiates adaptive power control to reduce power consumed by non-failing network elements 220-2 and 220-5.

For example, in one embodiment, to control a power mode setting of non-failing network element 220-2 and non-failing network element 220-5, the control resource 260 transmits generates and transmits a notification to non-failing network element 220-2 and non-failing network element 220-5. The notifications transmitted to non-failing network element 220-2 and non-failing network element 220-5 can indicate at least the identity of the network element 220-3 that experienced the failure. In a further non-limiting example embodiment, the control resource 260 includes location information in the notifications to non-failing network elements to indicate the geographical location of the failing network element 220-3.

The non-failing network elements 220-2 and 220-5 can adjust their respective power settings based on upon power control settings as specified by a received notification from the control resource 260. For example, the control resource can be configured to notify the non-failing network elements 220, via transmission of one or more messages from the control resource 260 to the network elements, of a failure as well as respective power setting control information indicating how to control power settings of a corresponding non-failing network element.

In accordance with other embodiments, in response to receiving notification of a failed network element such as failing network element 220-3, the non-failing network elements can revert to predetermined power settings programmed into the non-failing network element.

Thus, embodiments herein can include receiving a message from a particular failing network element indicating an identity and a location of the particular failing network element 220-3 that experiences a failure, and communicating the identity and the location to non-failing network elements 220-2 and 220-5.

In accordance with further embodiments, the control resource 260 can be configured to provide additional notifications in response to a condition such as detecting a failing network element. For example, in one embodiment, the power manager 140 can be configured to identify a location of the particular network element that experiences the failure. In response to detecting the failure, the power manager 140 can be configured to generate and transmit one or more status messages notifying a respective network technician of the failure and the location of the particular network element in the network environment.

In one embodiment, the communications from network elements 220 to control resource 260 as well as the communications from control resource 260 to network elements represent part of a control plane 225 to adaptively control power settings of the network elements 220 in the event of a respective failure. As previously discussed, the network elements cooperatively communicate amongst each other over a respective data plane to provide the one or more computer devices 150 connections to a core network and/or network 190-2. As discussed, failure of a respective network element in the In this example embodiment, in response to detecting the failure associated with network element 220-3, the control resource 260 initiates communications to non-failing network element 220-2 and non-failing network element 220-5 to a low power mode to reduce power consumption.

Monitoring a network environment and providing notifications of failing network elements and controlling power settings of non-failing network elements (and possibly the failing network elements) is useful over conventional techniques. For example, as discussed herein, one or more non-failing network element that depends on the proper functioning of the failing network element can be beneficially operated in a power savings mode.

Upon restoration of the failing network element back to proper operation, the non-failing network element can be operated in a standard operational mode (e.g., non-power savings mode) again. For example, monitor resource 250 may detect that the failure associated with failing network element 220-3 is corrected. In response to such a condition, the control resource 260 notifies the non-failing network elements 220-2 and non-failing network element 220-5 to operate in a standard power mode again in which the network elements 220-2 and network element 220-5 are able to perform all operational functions again.

In accordance with further embodiments, note that a respective network element may experience a partial failure. For example, assume that the failing network element 220-3 is able to execute a first function but is unable to execute a second function due occurrence of a failure. Assume further that network element 220-2 may rely on proper operation of the first function and that network element 220-5 may rely only on proper operation of the second function associated with network element 220-3. In such an instance, in response to receiving notification from the network element 220-3 that the first function fails and the second function is functioning properly, the power manager 140 initiates setting network element 220-2 to a reduced power mode while network element 220-5 is operated in a fully operational and full power mode.

Figure 4:
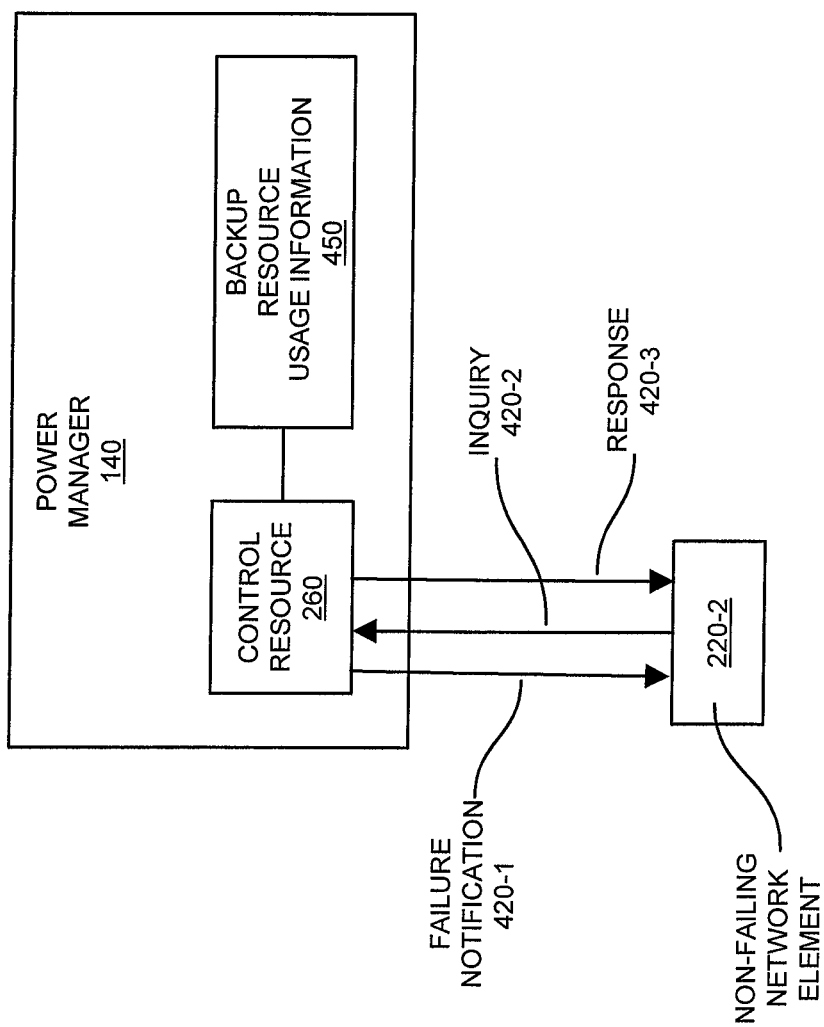
FIG. 4 is an example diagram illustrating use of fallback resource information to repair network functionality according to embodiments herein.

FIG. 4 is an example diagram illustrating use of fallback resource information according to embodiments herein.

As discussed above, embodiments herein can include notifying a respective non-failing network element of the identity and/or geographical location information of a failing network element. In response to receiving the message of the failing node, the non-failing network element may operate in a reduced power mode until the failing network element returns to a normal operational mode (e.g., non-failing mode) again.

In accordance with further embodiments, the non-failing network element 220-2 can attempt to repair itself in response to detecting that related node (e.g., network element 220-3) fails. For example, in a manner as previously discussed, assume that the control resource 260 transmits failure notification 420-1 to non-failing network element 220-2. The failure notification 420-1 can include information such as an identity of the failing network element, geographical location of the failing network element 220-3, etc. The non-failing network element 220-2 may have access to information indicating one or more alternative resources to use in the event that the network element 220-3 fails. For example, assume that the non-failing network element 220-2 has access to information indicating that a network element such as a server node in Boston can provide the services previously provided by failing network element 220-3. To recover from the failure of network element 220-3, the non-failing network element 220-2 may attempt to use a substitute network element in Boston in lieu of the failing network element 220-3.

In one embodiment, the network element 220-2 transmits the inquiry 420-2 to control resource 260. The inquiry 420-2 can include a query directed to the control resource 260 checking whether a (proposed) network element in the Boston region is available for use by the network element 220-2 as a substitute to using the failing network element 220-3 (which in this example happens to be located in Denver). As previously discussed, the monitor resource 250 can be configured as a central manager that queries different network elements to learn of their health (e.g., whether they experience any failures). Thus, in response to sending the notification failure 420-1 to network element 220-2, the control resource 260 can receive the inquiry 420-2 from non-failing network element 220-2. As mentioned, the inquiry 420-2 can include an inquiry whether an alternative network element (such as the network element in the Boston region) is available for use as a substitute to the failing network element 220-3 located in Denver.

In response to receiving the inquiry 420-2, the control resource 260 communicates with monitor resource 250 to learn of any failures associated with network element in the Boston region. The control resource 260 may also perform an analysis to determine a suitable alternative to the failing network element 220-3 or whether a substitute network element proposed by the non-failing network element 220-2 is acceptable. In the event that the control resource 260 is configured to determine a suitable alternative to the failing network element 220-3, the control resource 260 can access backup resource usage information 450. By way of a non-limiting example, backup resource usage information 450 can include an entry indicating one or more network elements that serve as a substitute network element if network element 220-3 fails.

Assuming that there are no reported failures associated with the proposed network element in the Boston region, and after verifying that the alternative network element in Boston is free from failures via a health status message from the Boston located network element, the control resource 260 generates response 420-3 to non-failing network element 220-2. The response 420-3 can include an affirmation that use of the network element in Boston as a substitute is acceptable. Accordingly, embodiments herein can include transmitting a response 420-3 to the non-failing network element 220-2, granting the network element 220-2 permission to use the alternative proposed network element in Boston as the substitute.

Figure 5:
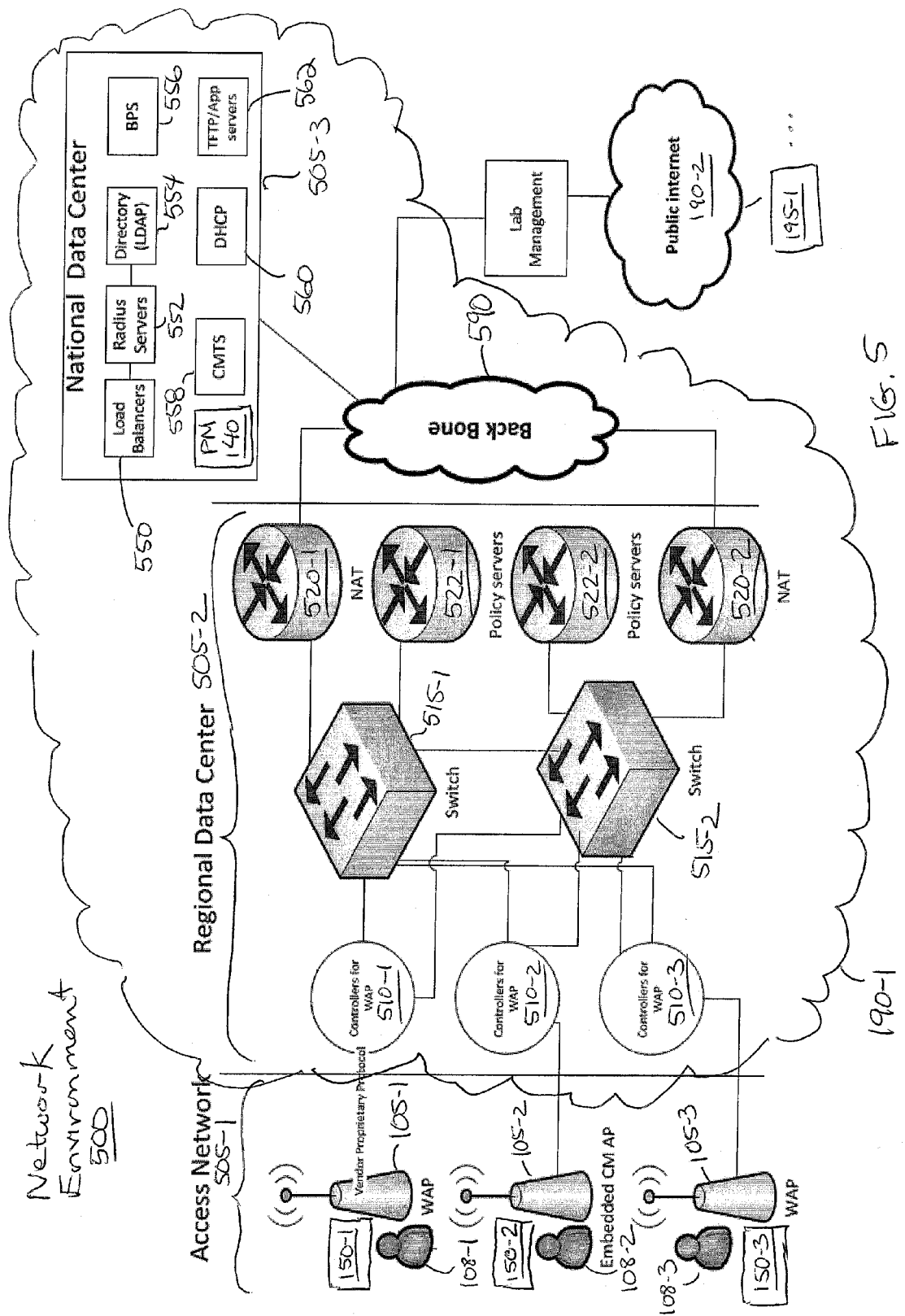
FIG. 5 is an example diagram illustrating a power manager and interconnectivity of network elements in a network environment according embodiments herein.

FIG. 5 is an example diagram illustrating a network environment and interconnectivity of different network elements according embodiments herein. Via power manager 140, any of the different network elements in network environment 500 can be monitored and adaptively power controlled via power manager 140.

As shown, access network 505-1 of network environment 500 includes different network elements computer devices 150-1, 150-2, 150-3, etc., and respective access points 105-1, 105-2, 105-3, etc.

Access network 505-1 is communicatively coupled to regional data center 505-2. Regional data center 505-2 of network environment 500 includes network elements such as wireless access point controllers 510-1, 510-2, 510-3, . . . , switches 515-1, 515-2, . . . , NAT (Network Address Translation) devices 520-1, 520-2, . . . , policy servers 522-1, 522-2, . . . .

Backbone network 590 couples the regional data center 505-2 to national data center 505-3. Backbone network 590 also couples regional data center 505-2 to network 190-2 such as a public Internet.

National data center 505-3 includes any of multiple different types of network elements such as one or more load balancer servers 550, one or more radius servers 552 (Time Warner Cable Authentication, Authorization, and Accounting servers), one or more directory servers 554, Broadband Provisioning Servers 556, one or more DHCP (Dynamic Host Control Protocol) servers 560, one or more TFTP/Application servers 562, one or more cable modem termination systems 558, etc.

As previously discussed, establishing connectivity between computer devices 150 and network 190-2 may require cooperative communications amongst the different network elements. Further details of communications and interdependencies amongst network elements are shown and discussed in FIG. 7.

Figure 6:
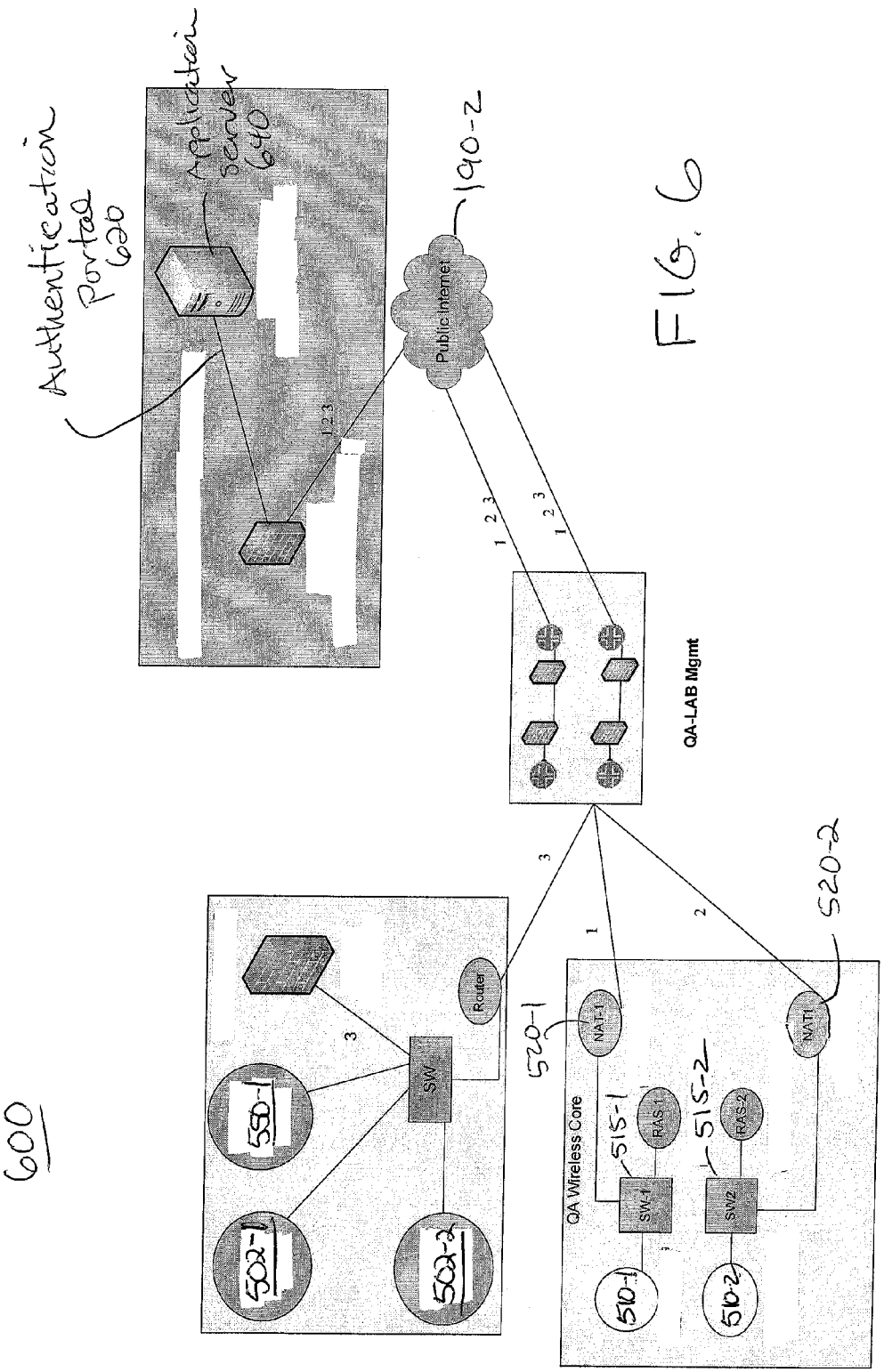
FIG. 6 is an example diagram illustrating a power manager and interconnectivity of network elements in a network environment according embodiments herein.

FIG. 6 is another example diagram illustrating a network environment and interconnectivity of network elements according embodiments herein. In addition to the network elements as previously discussed, the network element 600 includes a resource such as an application server 640 including an authentication portal 620. In one embodiment, the authentication portal is used as a way to control network access.

Figure 7:
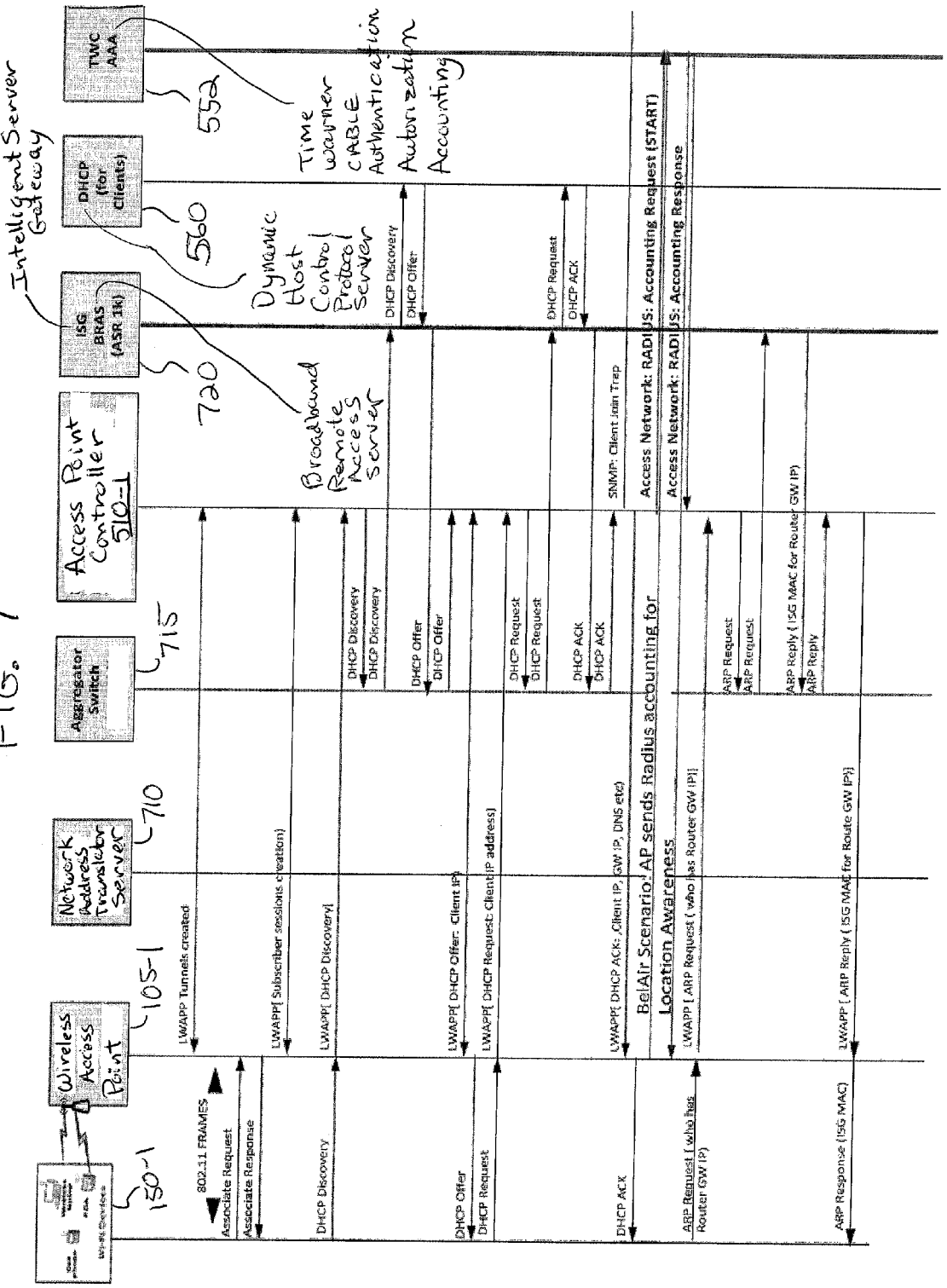
FIG. 7 is an example communication diagram illustrating communication interdependency of multiple network elements to provide connectivity according embodiments herein.

FIG. 7 is an example communication diagram illustrating communication interdependency amongst multiple network elements according embodiments herein. Note that this example of interdependency amongst network elements is shown by way of non-limiting example only and that power manager 140 can be configured to address any type of interdependencies.

In this example embodiment, as shown, wireless access point 105-1 creates a respective tunnel with access point controller 510-1. Via 802.11 communication frames, the computer device 150-1 communicates with wireless access point 105-1 to establish a respective communication link and access a network such as the Internet.

Initially, the computer device 150-1 creates an association with access point 105-1 to establish a wireless communication between the computer device 150-1 and access point 105-1.

In order to communicate over the network, the computer device 150-1 may need to be assigned a unique IP address. Towards this end, the wireless access point 105-1 creates a tunnel with wireless access point controller 510-1.

As further shown, computer device 150-1 communicates a DHCP discovery message to wireless access point 105-1. The DHCP discovery message is transmitted to a destination via cooperation amongst many different network elements. For example, wireless access point transmits the DHCP discovery message to the wireless access point controller 510-1. The wireless access point controller 510-1 forwards the DHCP discovery message to aggregator switch 715. Aggregator switch 715 transmits the DHCP discovery to gateway 720. Gateway 720 transmits the DHCP discovery message to DHCP server 560. Failure of any of these network elements may render it impossible to perform a function such as obtain a unique IP address.

DHCP server 560 replies with a DHCP offer message. Via communications in a reverse direction amongst multiple network elements (e.g., gateway 720, aggregator switch 715, access point controller 510-1, and wireless access point 105-1), the computer device 150-1 receives the DHCP offer.

Via a series of additional communications as shown in FIG. 7, the client computer device 150-1 is able to obtain an IP address.

Use of network elements in the regional data center 505-2 may be contingent upon proper authentication of the client, verification that the subscriber has paid his bills, etc. This may require access to any of the resources in national data center 505-3.

As previously discussed, any of the multiple different types of network elements may fail. In such an instance, and in a manner as previously discussed, the power manager 140 identifies and communicates with appropriate related non-failing network elements (or even the failing network element) to place them in a reduced power mode (e.g., a sleep mode, standby mode, full power shut down mode, etc.).

Network elements nearer to the computer device 150-1 represent downstream network elements in network environment 500. Network elements in regional data center 505-2 and national data center 505-3 represent upstream network elements with respect to the computer devices 150.

As mentioned, any of such network elements (upstream and/or downstream network elements) may experience a power failure. In such an instance, the power manager 140 notifies the dependent upstream and/or downstream network elements (depending on the circumstances) of the failure so that such devices can be placed in appropriate reduced power mode.

Thus, embodiments herein include way to inform upstream or downstream network elements with location information (e.g., GPS coordinates, grid locations inside a building, etc.) when network element outages occur among associated network elements. One or more dependent network elements can respond to a failure by shutting down or switching to a standby mode (reduced power mode).

As discussed above, in a Wi-Fi based wireless network, an access point is typically the downstream network element close to the end user, whereas the core network is comprised of a large number of computing devices residing in a national data center and a regional data center, both of which may be located far away from the respective access points 105.

In a typical data center, there may be more than 50 network elements housed to support end users (using Laptops or smart devices/cell phones) which are connected to Wi-Fi radios/Access Points. The Data Center key network elements range from CMTS (a bank of Cable Modems, RF switches, RF pads) to Access Point Controllers, Layer 2 & 3 switches, Routers, Intelligent Serving Gateways (ISG), NATs (Network Address Translators), Load Balancers, DHCP & DTFT Servers, AAA servers, and application servers.

Embodiments herein can include tracking down defective or out-of-service network elements, and calculating fallback paths to provide services to important technicians that are deployed to fix the faulty network elements. In a circumstance such as when total failure of a network element is detected, then a respective message control plane is used to send control messages to reduce processing power of remaining network elements to save both AC and/or DC power.

FIGS. 11-16 are diagrams illustrating example of candidate network elements for adaptive power control as discussed herein. As discussed herein, power settings of any of such network elements and other network elements in network environment 100, network environment 500, and network environment 600, can be controlled in response to detecting occurrence of a failure.

For example, FIG. 11 is an example diagram illustrating different types of wireless access points and consumed power.

FIG. 12 is an example diagram illustrating a power consumption summary associated with a Zoneflex access point.

FIG. 13 is an example diagram illustrating a power consumption summary associated with wireless access point controllers.

FIG. 14 is an example diagram illustrating power specification of an aggregation switch.

FIG. 15 is an example diagram illustrating power specification of a subscriber policy router.

FIG. 16 is an example diagram illustrating power specification of a radius server.

Figure 8:
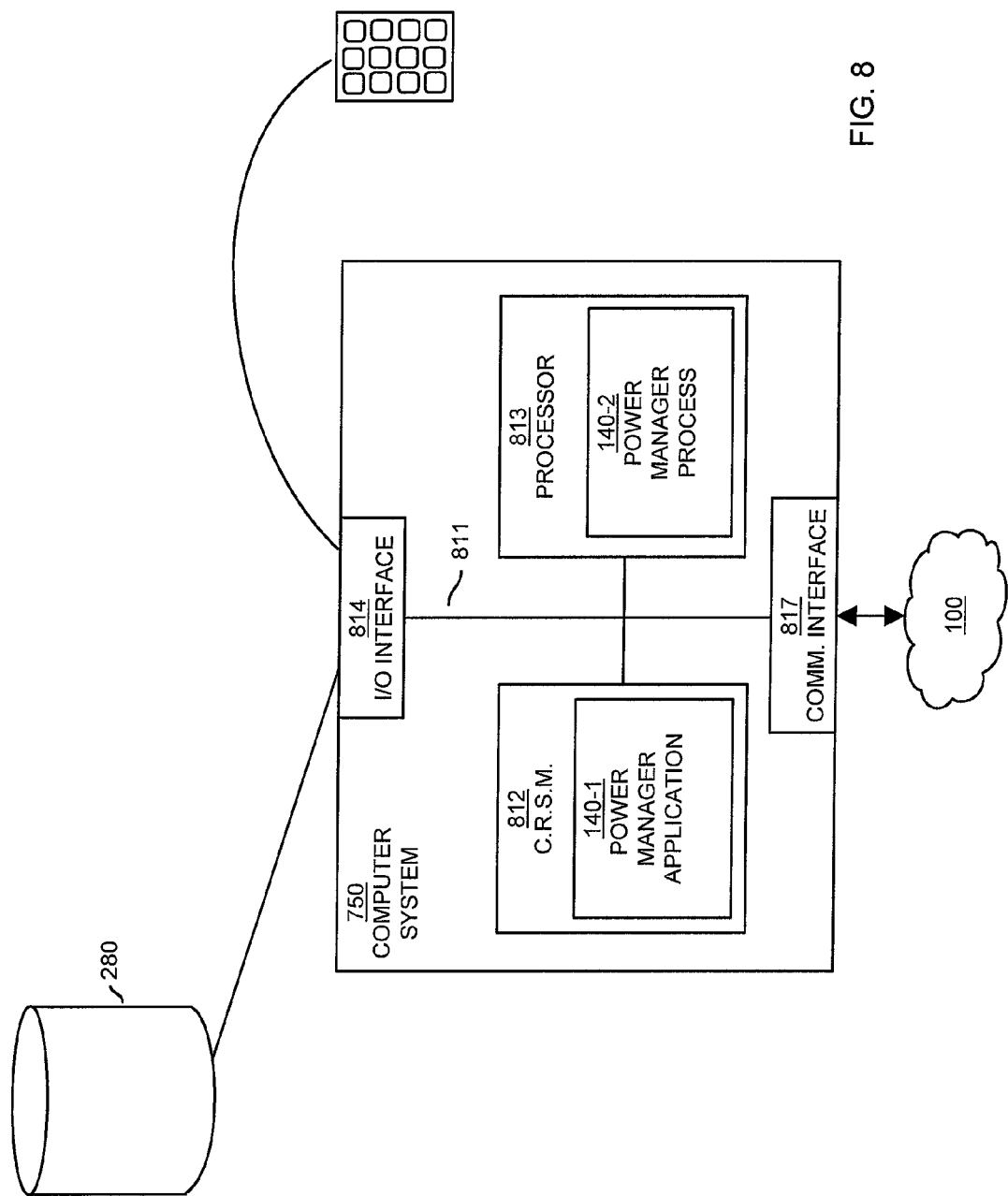
FIG. 8 is a diagram illustrating an example computer architecture in which to execute any of the functionality according to embodiments herein.

FIG. 8 is an example block diagram of a computer device for implementing any of the operations as discussed herein.

As shown, computer system 750 such as a computer device of the present example can include an interconnect 811 that couples computer readable storage media 812 such as a non-transitory type of media (i.e., any type of hardware storage medium, tangible storage medium, etc.) in which digital information can be stored and retrieved, a processor 813 (e.g., one or more processor devices or hardware processors), I/O interface 814, and a communications interface 817. Communications interface 817 enables the computer system 750 to communicate with network elements present in a corresponding network environment.

I/O interface 814 provides connectivity to a repository 280 and, if present, other devices such as a playback device, display screen, keypad, a computer mouse, etc.

Computer readable storage medium 812 can be any hardware storage resource or device such as memory, optical storage, hard drive, floppy disk, etc. In one embodiment, the computer readable storage medium 812 stores instructions and/or data.

Communications interface 817 enables the computer system 150 and processor 813 to communicate with network elements in network environment 100 to retrieve information from remote sources such as network elements and communicate with other computers. I/O interface 814 enables processor 813 to retrieve stored information such as interdependency information 210 from repository 280.

As shown, computer readable storage media 812 is encoded with power manager application 140-1 (e.g., software, firmware, computer code, etc.) executed by processor 813. Power manager application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in power manager application 140-1 stored on computer readable storage medium 812.

Execution of the power manager application 140-1 produces processing functionality such as power manager process 140-2 in processor 813. In other words, the power manager process 140-2 associated with processor 813 represents one or more aspects of executing power manager application 140-1 within or upon the processor 813 in the computer system 750.

Those skilled in the art will understand that the computer system 750 can include other processes and/or software and hardware components, such as an operating system that controls allocation and use of hardware resources to execute power manager application 140-1.

In accordance with different embodiments, note that computer system 750 may be any of various types of devices, including, but not limited to, a mobile computer, a personal computer system, a server resource, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 750 may reside at any location or can be included in any suitable resource in network environment 100 to implement functionality as discussed herein.

Functionality supported by the different resources will now be discussed via flowcharts in FIGS. 9-10. Note that the steps in the flowcharts below can be executed in any suitable order.

Figure 9:
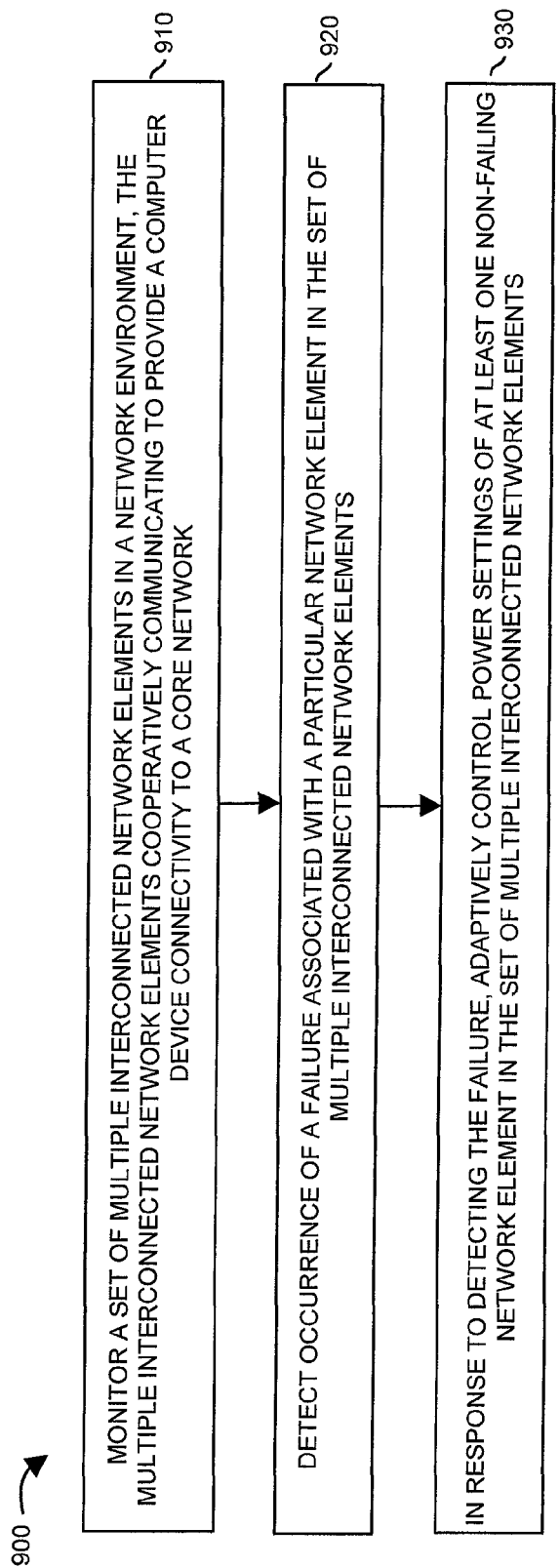
FIG. 9 is an example diagram illustrating a method of adaptively controlling power settings of network elements in a network environment according to embodiments herein.

FIG. 9 is a flowchart 900 illustrating an example method according to embodiments. Note that there will be some overlap with respect to concepts as discussed above.

In processing block 910, the power manager 140 monitors a set of multiple interconnected network elements 220 in a network environment 100. The multiple interconnected network elements 220 cooperatively communicate to provide computer device 150-1 connectivity to a core network.

In processing block 920, the power manager 140 detects occurrence of a failure associated with a particular network element 220-3 in the set of multiple interconnected network elements 220.

In processing block 930, in response to detecting the failure, the power manager 140 adaptively controls power settings of at least one non-failing network element (e.g., network element 220-2 and network element 220-5) in the set of multiple interconnected network elements 220.

Figure 10:
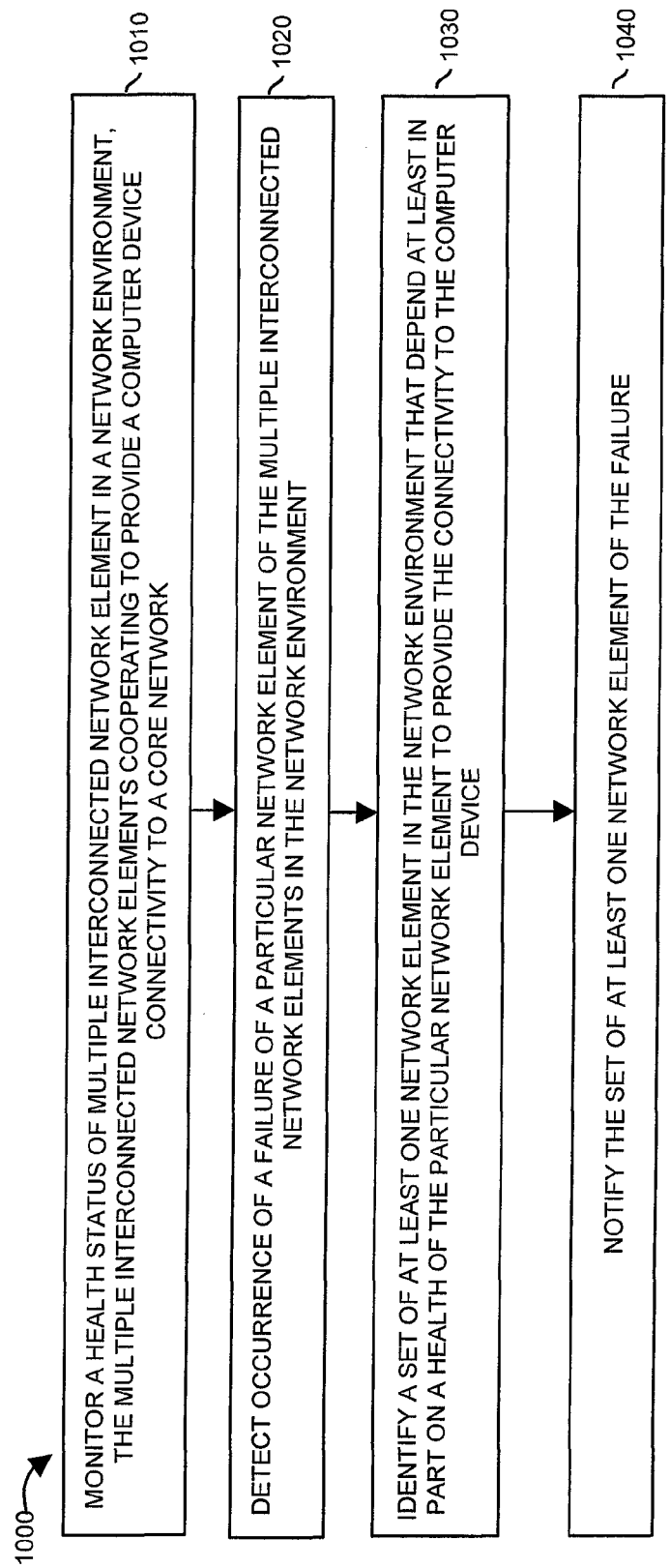
FIG. 10 is an example diagram illustrating a method of identifying network element failures and providing notifications in a network environment according to embodiments herein.

FIG. 10 is a flowchart 1000 illustrating an example method according to embodiments. Note that there will be some overlap with respect to concepts as discussed above.

In processing block 1010, the power manager 140 monitors a health status of multiple interconnected network elements 220 in a network environment 100. The multiple interconnected network elements 220 cooperate to provide computer device 150-1 connectivity to a core network.

In processing block 1020, the power manager 140 detects occurrence of a failure of network element 220-3 of the multiple interconnected network elements 220 in the network environment 100.

In processing block 1030, the power manager 140 identifies a set of one or more network elements 220 in the network environment 100 that depend at least in part on a health of the particular network element 220-3 to provide the connectivity to the computer device 150-1.

In processing block 1040, the power manager 140 notifies the set of one or more network elements of the failure.

Note again that techniques herein are well suited for reducing power consumption in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
via computer processor hardware, performing operations of:
at a power management resource disparately located with respect to a set of multiple interconnected network elements in a network environment, monitoring the set of multiple interconnected network elements, the multiple interconnected network elements cooperatively communicating to provide a computer device connectivity through the network environment to a core network;
based on the monitoring, at the power management resource, receiving respective feedback from each of the multiple interconnected network elements in the set;
from the respective feedback, detecting occurrence of a failure associated with a particular network element in the set of multiple interconnected network elements; and
in response to detecting the failure of the particular network element based on the respective feedback, adaptively controlling power consumption settings of at least one non-failing network element in the set of multiple interconnected network elements.

2. The method as in claim 1, wherein detecting occurrence of the failure includes:
receiving a message from the particular network element, the message including identity information indicating an identity of the particular network element and location information indicating a location of the particular network element.

3. The method as in claim 1 further comprising:
identifying a location of the particular network element that experiences the failure; and
wherein adaptively controlling the power settings includes notifying the at least one non-failing network element of a geographical location and identity of the particular network element that experienced the failure.

4. The method as in claim 1 further comprising:
obtaining an identity of the particular network element that experiences the failure; and wherein adaptively controlling the power consumption settings includes notifying the at least one non-failing network element of the identity of the particular network element that experienced the failure.

5. The method as in claim 1 further comprising:
identifying a location of the particular network element that experiences the failure; and
in response to detecting the failure, generating a status message, the status message notifying a respective network technician of the failure and the location of the particular network element in the network environment.

6. The method as in claim 1, wherein the multiple interconnected network elements cooperatively communicate over a data plane of the network environment to provide the computer device the connectivity to the core network; and
wherein adaptively controlling power settings includes communicating over a control plane of the network environment to notify the at least one non-failing network element in the set of a geographical location and identity of the particular network element that experienced the failure.

7. The method as in claim 6 further comprising:
storing interdependency information associated with the multiple interconnected network elements, the interdependency information indicating a communication interdependency of the multiple interconnected network elements; and
wherein identifying the set of at least one network element in the network environment includes analyzing the communication interdependency to identify the set of at least one network element in the network environment that depend at least in part on the particular element to provide the connectivity to the computer device.

8. The method as in claim 1 further comprising:
in response to detecting the failure, adaptively controlling power consumption settings of the particular network element that experiences the failure.

9. The method as in claim 1, wherein adaptively controlling the power consumption settings of at least one non-failing network element includes notifying the at least one non-failing network element of a geographical location of the particular network element that experienced the failure, the method further comprising:
receiving a response from a given non-failing network element in the set that receives notification of the geographical location, the response including an inquiry whether an alternative network element is available for use as a substitute to the particular network element.

10. The method as in claim 9 further comprising:
verifying that an alternative network element in the geographical location is free from failures; and
transmitting a reply to the given non-failing network element, the reply granting the given network element permission to use the alternative network element as the substitute.

11. A method comprising:
at power manager hardware, monitoring a health status of multiple interconnected network elements in a network environment, the multiple interconnected network elements cooperating to provide a computer device connectivity to a core network, the power manager hardware disparately located with respect to the interconnected network elements;
based on the monitoring, at the power management hardware, receiving respective feedback from each of the multiple interconnected network elements;
from the respective feedback, detecting occurrence of a failure of a particular network element of the multiple interconnected network elements in the network environment;
identifying a set of multiple network elements in the network environment that depend at least in part on a health of the particular network element to provide the connectivity to the computer device, each of the interconnected network elements in the set physically located at disparate locations with respect to each other; and
in response to detecting the failure of the particular network element based on the respective feedback, notifying the set of multiple network elements of the failure to adaptively control power consumption settings of at least one non-failing network element in the set of multiple network elements.

12. The method as in claim 11, wherein notifying the set of multiple network elements of the failure includes transmitting respective power setting control information to each network element in the set, the respective power setting control information indicating how to control power settings of a corresponding network element to which the respective power setting control information is transmitted.

13. The method as in claim 11, wherein monitoring the health status includes receiving a respective health status message from each of multiple interconnected network elements, each respective health status message indicating a geographical location of a corresponding network element that transmits the respective health status message; and
wherein notifying the set of multiple network elements of the failure includes transmitting geographic location information to the set of multiple network elements, the geographic location information indicating a location of the particular network element that experiences the failure.

14. The method as in claim 11, wherein detecting the failure includes:
failing to receive a health status message from the particular network element indicating that the particular network element is functioning properly.

15. The method as in claim 11, wherein detecting the failure includes receiving a health status message from the particular network element indicating the failure.

16. The method as in claim 11 further comprising:
receiving a message from the particular network element, the message identity information indicating an identity of the particular network element and location information specifying a location of the particular network element that experiences the failure; and
communicating the identity information and the location information to the set of multiple network elements.

17. The method as in claim 16 further comprising:
receiving a response from a given network element in the set, the response including an inquiry whether an alternative network element in a specified geographical location is available for use as a substitute to the particular network element.

18. The method as in claim 17 further comprising:
verifying that alternative network element in the specified geographical location is free from failures; and
transmitting a reply to the given network element, the reply granting the given network element use of the alternative network element as the substitute.

19. The method as in claim 11, wherein notifying the set of multiple network elements of the failure includes:
adaptively controlling power consumption settings of the multiple network elements in the set.

20. The method as in claim 11, wherein the multiple interconnected network elements includes at least one upstream network element with respect to at least one downstream network element, the method further comprising:
storing interdependency information associated with multiple interconnected network elements, the interdependency information indicating a functional interdependency of the multiple interconnected network elements; and
wherein identifying the set of multiple network elements in the network environment includes analyzing the interdependency information to identify the set of multiple network elements in the network environment whose communications depend at least in part on a health of the particular network element to provide the connectivity to the computer device.

21. A computer system comprising:
computer processor hardware; and
a hardware storage resource coupled to the computer processor hardware, the hardware storage resource storing instructions that, when executed by the computer processor hardware, causes the computer processor hardware to perform operations of:
monitoring a set of multiple interconnected network elements in a network environment, the multiple interconnected network elements cooperatively communicating to provide a computer device connectivity to a core network;
based on the monitoring, receiving respective feedback from each of the multiple interconnected network elements in the set;
from the respective feedback, detecting occurrence of a failure associated with a particular network element in the set of multiple interconnected network elements; and
in response to detecting the failure of the particular network element based on the respective feedback, and to reduce power consumption based on the occurrence of the failure, adaptively controlling power consumption settings of at least one non-failing network element in the set of multiple interconnected network elements.

22. The computer system as in claim 21, wherein detecting occurrence of the failure includes:
receiving a message from the particular network element, the message including identity information indicating an identity of the particular network element and location information indicating a location of the particular network element.

23. The computer system as in claim 21, wherein the computer processor hardware further performs operations of:
identifying a location of the particular network element that experiences the failure; and
wherein adaptively controlling the power consumption settings includes notifying the at least one non-failing network element of a geographical location and identity of the particular network element that experienced the failure.

24. The computer system as in claim 21, wherein the computer processor hardware further performs operations of:
obtaining an identity of the particular network element that experiences the failure; and
wherein adaptively controlling the power consumption settings includes notifying the at least one non-failing network element of the identity of the particular network element that experienced the failure.

25. The computer system as in claim 21, wherein the computer processor hardware further performs operations of:
identifying a location of the particular network element that experiences the failure; and
in response to detecting the failure, generating a status message, the status message notifying a respective network technician of the failure and the location of the particular network element in the network environment.

26. The computer system as in claim 21, wherein the multiple interconnected network elements cooperatively communicate over a data plane of the network environment to provide the computer device the connectivity to the core network; and
wherein adaptively controlling power consumption settings includes communicating over a control plane of the network environment to notify the at least one non-failing network element in the set of a geographical location and identity of the particular network element that experienced the failure.

27. The computer system as in claim 26, wherein the computer processor hardware further performs operations of:
storing interdependency information associated with the multiple interconnected network elements, the interdependency information indicating a communication interdependency of the multiple interconnected network elements; and
wherein identifying the set of at least one network element in the network environment includes analyzing the communication interdependency to identify the set of at least one network element in the network environment that depend at least in part on the particular element to provide the connectivity to the computer device.

28. The computer system as in claim 21, wherein the computer processor hardware further performs operations of:
in response to detecting the failure, adaptively controlling power consumption settings of the particular network element that experiences the failure.

29. The computer system as in claim 21, wherein adaptively controlling the power consumption settings of at least one non-failing network element includes notifying the at least one non-failing network element of a geographical location of the particular network element that experienced the failure, the computer processor hardware further performing operations of:
receiving a response from a given non-failing network element in the set, the response including an inquiry whether an alternative network element is available for use as a substitute to the particular network element.

30. The computer system as in claim 29, wherein the computer processor hardware further performs operations of:
verifying that alternative network element in the specified geographical location is free from failures; and transmitting a reply to the given non-failing network element, the reply granting the given network element permission to use the alternative network element as the substitute.

31. Computer-readable hardware storage having instructions stored thereon, the instructions, when carried out by computer processor hardware, causes the computer processor hardware to:
monitor a set of multiple interconnected network elements in a network environment, the multiple interconnected network elements cooperatively communicating to provide a computer device connectivity through the network environment to a core network;
based on the monitoring, at the power management resource, receive respective feedback from each of the multiple interconnected network elements in the set;
from the respective feedback, detect occurrence of a failure associated with a particular network element in the set of multiple interconnected network elements; and
in response to detecting the failure of the particular network element based on the respective feedback, adaptively control power consumption settings of at least one non-failing network element in the set of multiple interconnected network elements.

32. The method as in claim 1, wherein respective feedback received from the particular network element indicates occurrence of the failure.

33. The method as in claim 32, wherein adaptively controlling power consumption settings includes transmitting a power control message to a first non-failing network element in the set to reduce power consumption by the first non-failing network element in response to detecting the failure.

34. The method as in claim 33, wherein the transmitted message is a control message that places the particular non-failing network element into a sleep mode.

35. The method as in claim 1 further comprising:
identifying a location of the particular network element that experiences the failure; and
wherein adaptively controlling the power settings includes notifying the at least one non-failing network element of a geographical location and identity of the particular network element that experienced the failure.

36. The method as in claim 1, wherein cooperative communicating among the network elements includes forwarding a communication through a series interconnection including the network elements.

37. The method as in claim 20, wherein the particular network element is an upstream network element with respect to a non-failing downstream network element in the network environment; and
wherein adaptively controlling the power settings includes notifying the non-failing downstream network element of an identity of the upstream network element that experienced the failure.

38. The method as in claim 33, wherein the transmitted message is a control message that places the particular non-failing network element into a sleep mode, the method further comprising:
identifying a location of the particular network element that experiences the failure; and
wherein adaptively controlling the power settings includes notifying the at least one non-failing network element of a geographical location and identity of the particular network element that experienced the failure.

39. The method as in claim 38, wherein cooperative communicating among the network elements includes forwarding a communication through a series interconnection including each of the interconnected network elements in the set.

40. The method as in claim 1, wherein detecting occurrence of the failure includes:
at the power management resource, receiving a message from the particular network element over a communication link, the message including identity information indicating an identity of the particular network element.

41. The method as in claim 1 further comprising:
identifying a location of the particular network element that experiences the failure.

42. The method as in claim 41, wherein adaptively controlling the power consumption settings includes notifying the at least one non-failing network element of an identity of the particular network element that experienced the failure.

43. The method as in claim 42 further comprising:
receiving a response from a given non-failing network element in the set that receives notification of the identity of the particular network element, the response including an inquiry whether any alternative network elements are available for use as a substitute to the particular network element;
verifying that an alternative network element with respect to the particular network element in the geographical location is free from failures; and
transmitting a reply to the given non-failing network element, the reply granting the given network element permission to use the verified alternative network element as the substitute to the particular network element.

* * * * *